US012285924B1

(12) United States Patent
Park et al.

(10) Patent No.: US 12,285,924 B1
(45) Date of Patent: Apr. 29, 2025

(54) APPARATUS FOR MANUFACTURING A DOUBLE WALL PAPER CUP

(71) Applicant: HYUNJIN CO., LTD, Ansan-si (KR)

(72) Inventors: Janghyun Park, Ansan-si (KR); Jinyang Jung, Ansan-si (KR); Hyunsung Jung, Ansan-si (KR); Moonsoo Kim, Ansan-si (KR)

(73) Assignee: HYUNJIN CO., LTD, Ansan-si (KR)

( * ) Notice: Subject to any disclaimer, the term of this patent is extended or adjusted under 35 U.S.C. 154(b) by 0 days.

(21) Appl. No.: 18/916,820

(22) Filed: Oct. 16, 2024

(30) Foreign Application Priority Data

May 2, 2024 (KR) ........................ 10-2024-0058793

(51) Int. Cl.
*B31D 5/00* (2017.01)
*B31D 5/04* (2017.01)

(52) U.S. Cl.
CPC ............. *B31D 5/04* (2013.01); *B31D 5/0086* (2013.01)

(58) Field of Classification Search
CPC ........ B31D 5/04; B31D 5/0086; B31B 50/60; B31B 2110/20
USPC .................................................. 493/395, 109
See application file for complete search history.

(56) References Cited

U.S. PATENT DOCUMENTS 2,442,527 A * 6/1948 Zesbaugh ............... B31B 70/00 215/350
7,614,993 B2 * 11/2009 Van Handel ............ B29C 61/02 493/163
2023/0373184 A1 * 11/2023 Huh ........................ B31B 50/74

FOREIGN PATENT DOCUMENTS

| | | | | |
|---|---|---|---|---|
| KR | 20050033703 A | * 4/2005 | | B31C 7/02 |
| KR | 100496959 B1 | 6/2005 | | |
| KR | 20150019484 A | * 2/2015 | | B31C 7/02 |
| KR | 101535887 B1 | 7/2015 | | |
| KR | 1020230162301 A | 11/2023 | | |
| KR | 1020240036846 A | 3/2024 | | |

* cited by examiner

*Primary Examiner* — Jacob A Smith
(74) *Attorney, Agent, or Firm* — S. J. INTELLECTUAL PROPERTY; Avi Jencmen

(57) ABSTRACT

An apparatus for manufacturing a double wall paper cup is provided. The apparatus includes: a first rotation table configured to rotate intermittently on a horizontal rotating shaft; a plurality of slots for an outer cup part, each of which is installed at intervals of a first predetermined angular value on an outer peripheral surface of the first rotation table; a second rotation table configured to rotate intermittently on a vertical rotating shaft; a stroker configured to move up and down at a combining location; and a cup-combining unit including: (i) a plurality of inner cup part mandrels, each of which is installed at intervals of a second predetermined angular value on a circumference area of an upper surface of the second rotation table; and (ii) a plurality of pushers, each of which has each of pushing shafts capable of moving up and down in directions perpendicular to the ground surface.

10 Claims, 7 Drawing Sheets

APPARATUS FOR MANUFACTURING A DOUBLE WALL PAPER CUP

CROSS REFERENCE OF RELATED APPLICATION

This present application claims the benefit of the earlier filing date of Korean non-provisional patent application No. 10-2024-0058793, filed on May 2, 2024, the entire contents of which being incorporated herein by reference.

FIELD OF THE DISCLOSURE

The present disclosure relates to an apparatus for manufacturing a double wall paper cup and more particularly relates to the apparatus for manufacturing the double wall paper cup by inserting an inner cup part into an outer part with the aid of a pusher and a stroker.

BACKGROUND OF THE DISCLOSURE

Currently, paper cups are commonly used to hold liquids like water, coffee, juice, etc. However, an ordinary paper cup may cause a person to have a difficulty to grip when the ordinary paper cup holds high-temperature liquid such as hot coffee or low-temperature liquid such as ice cold water, since a temperature of the ordinary paper cup becomes extremely high or low according to the temperature of the liquid.

Accordingly, a double wall paper cup has been developed by covering the ordinary paper cup with an additional paper cup, which may prevent a temperature of the additional paper cup from becoming extremely high or extremely low due to an insulating layer formed between the ordinary paper cup and the additional paper cup.

Further, as demand for the double wall paper cups has risen, there is a need to develop devices for producing the double wall paper cups quickly and accurately.

However, conventional devices for producing the double wall paper cups have a lot of problems in that an outer cup part is inaccurately combined with an inner cup part during processes of moving the outer cup part toward the inner cup part and causing the outer cup part to be combined with the inner cup part. As examples of the problems, a twisted outer cup part may be combined with the inner cup part and the outer cup part may not be fully combined with the inner cup part.

Accordingly, it is necessary to invent an advanced apparatus for quickly and accurately producing the double wall paper cups.

SUMMARY OF THE DISCLOSURE

It is an object of the present disclosure to solve all the aforementioned problems.

It is another object of the present disclosure to accurately combine an inner cup part with an outer cup part by using a pusher of a cup-combining unit and a stroker such that the inner cup part held on a specific inner cup part mandrel is pushed up to a specific slot where the outer cup part has been inserted.

It is still another object of the present disclosure to fix a lower end of the outer cup part at a sharp groove formed inside of the specific slot.

It is still yet another object of the present disclosure to perform all of processes of holding the outer cup part on a rotation table, manufacturing the double wall paper cup by combining the inner cup part with the outer cup part, and discharging the double wall paper cup from the specific slot.

In accordance with one aspect of the present disclosure, there is provided an apparatus for manufacturing a double wall paper cup comprising: a first rotation table configured to rotate intermittently on a horizontal rotating shaft, wherein the horizontal rotating shaft is arranged to be horizontal to a ground surface; a plurality of slots for an outer cup part, each of which is installed at intervals of a first predetermined angular value on an outer peripheral surface of the first rotation table, wherein a specific slot among the slots is configured to hold a lower end of the outer cup part by using a sharp groove formed inside of the specific slot after the outer cup part is inserted into the specific slot at an outer cup part-providing location; a second rotation table configured to rotate intermittently on a vertical rotating shaft, wherein the vertical rotating shaft is arranged to be vertical to the ground surface; a stroker, which is installed under the second rotation table, wherein a part of the stroker is configured to move up and down at a combining location; and a cup-combining unit including: (i) a plurality of inner cup part mandrels, each of which is installed at intervals of a second predetermined angular value on a circumference area of an upper surface of the second rotation table; and (ii) a plurality of pushers, each of which has each of pushing shafts engaged with each of heads, wherein each of the pushing shafts is capable of moving up and down in directions perpendicular to the ground surface via each of through-holes formed through each of the inner cup part mandrels and the second rotation table, wherein a specific pushing shaft among the pushing shafts is configured to be moved to a lower side of the second rotation table or to be moved to an upper side of the second rotation table via a specific through-hole among the through-holes, and wherein a specific head among the heads is in contact with a lower end of an inner cup part; in case the specific pushing shaft is moved to the upper side of the second rotation table by using the stroker at the combining location, the inner cup part held on a specific inner cup part mandrel among the inner cup part mandrels is pushed up to the specific slot where the outer cup part has been inserted, thereby allowing the outer cup part to be combined with the inner cup part.

As one example, the stroker includes: (i) a stroking rod, which is connected to a lower end of the specific pushing shaft under the second rotation table, wherein the stroking rod is configured to be moved in directions parallel to a longitudinal axis of the specific pushing shaft, and wherein a block part with a predetermined shape is mounted at an upper end of the stroking rod; (ii) a rotary plate configured to rotate by receiving a driving force, wherein the rotary plate has a cylindrical shape; (iii) a first link whose first one end is rotatably engaged with a lower part of the stroker and whose first opposite end is rotatably engaged with a lower end of the stroking rod; and (iv) a second link whose second one end is rotatably engaged with a first predetermined point and whose second opposite end is rotatably engaged with a second predetermined point, wherein the first predetermined point is located on a surface of the rotary plate and apart from a center point of the rotary plate by a first distance, wherein the second predetermined point is located on a surface of the first link and apart from the first opposite end by a second distance.

As one example, the stroker further includes: a guide part configured to be installed below the second rotation table along a longitudinal direction of the specific pushing shaft, wherein the guide part is installed to be apart from the stroking rod toward both sides of the stroking rod by a predetermined distance, and wherein the guide part is in contact with side surfaces of the block part, thereby allowing the stroking rod to move in the directions parallel to the longitudinal axis of the specific pushing shaft.

As one example, the specific slot includes: (i) a first body which surrounds at least some parts of an outer surface of the outer cup part while the outer cup part is inserted into the specific slot, wherein the first body has an inner side surface with a first taper angle such that the inner side surface of the first body is in contact with the outer surface of the outer cup part; and (ii) a second body which has a side surface with a second taper angle and a lower surface that is in contact with a bottom surface of the inner cup part after the inner cup part is inserted into the specific slot, wherein the second taper angle is different from the first taper angle; wherein the sharp groove is formed between the inner side surface of the first body and the side surface of the second body such that the lower end of the outer cup part is inserted into the sharp groove.

As one example, the specific slot further includes: an air jet part configured to emit blast-air from an upper side of the second body to a lower side of the second body via at least one first through-hole with a first diameter such that the double wall paper cup is discharged from the specific slot by the blast-air at a discharging location.

As one example, the specific slot further includes: (i) at least one first vacuum hole configured to draw in absorbing-air from the inner side surface of the first body to an outer side surface of the first body via at least one second through-hole with a second diameter by using a first vacuum pump such that the outer surface of the outer cup part sticks to the inner side surface of the first body; and (ii) at least one second vacuum hole configured to draw in absorbing-air from the lower side of the second body to the upper side of the second body via at least one third through-hole with a third diameter by using a second vacuum pump such that the bottom surface of the inner cup part sticks to the lower surface of the second body.

As one example, the apparatus for manufacturing the double wall paper cup further comprises: an outer cup-forming part including: (i) a turret configured to rotate intermittently on an outer cup part-rotating shaft arranged to be vertical to the ground surface, wherein a plurality of outer cup part mandrels are installed on the turret at intervals of a third predetermined angular value around the outer cup part-rotating shaft; (ii) an outer cup part-folding part configured to generate the outer cup part with a tapered shape by using a specific outer cup part mandrel among the outer cup part mandrels at a folding location to thereby fold an original paper for the outer cup part; and (iii) an outer cup part-providing part configured to transfer the outer cup part from the specific outer cup part mandrel to the specific slot at an outer cup part-providing location such that the outer cup part is held in the specific slot with the lower end of the outer cup part being fixed at the sharp groove.

As one example, the cup-combining unit further includes: a plurality of rotary driving parts, each of which is located below each of the inner cup part mandrels and installed on a lower surface of the second rotation table, wherein each of the rotary driving parts is in contact with each of driving shafts corresponding to each of the inner cup part mandrels, wherein each of the driving shafts surrounds at least some parts of each of the pushing shafts such that each of the inner cup part mandrels is rotated on a central axis thereof.

As one example, the apparatus for manufacturing the double wall paper cup further comprises: at least one hot melt nozzle configured to coat a hot melt adhesive onto an outer side surface of the inner cup part at a hot-melting location near a circumference part of the second rotation table while the inner cup part is being rotated due to a rotation of the specific inner cup part mandrel, wherein the hot melt nozzle is arranged to be apart from the inner cup part by a certain distance.

As one example, the apparatus for manufacturing the double wall paper cup further comprises: at least one air nozzle configured to emit cooling-air to the outer side surface of the inner cup part onto which the hot melt adhesive is coated, wherein the air nozzle is located at a main air-cooling location near the circumference part of the second rotation table, wherein the main air-cooling location is located downstream of a preliminary-cooling location with respect to a rotation path of the circumference part of the second rotation table, wherein the preliminary-cooling location located near the circumference part of the second rotation table is configured to cool the hot melt adhesive at room temperature, and wherein the preliminary-cooling location is located downstream of the hot-melting location with respect to the rotation path of the circumference part of the second rotation table.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
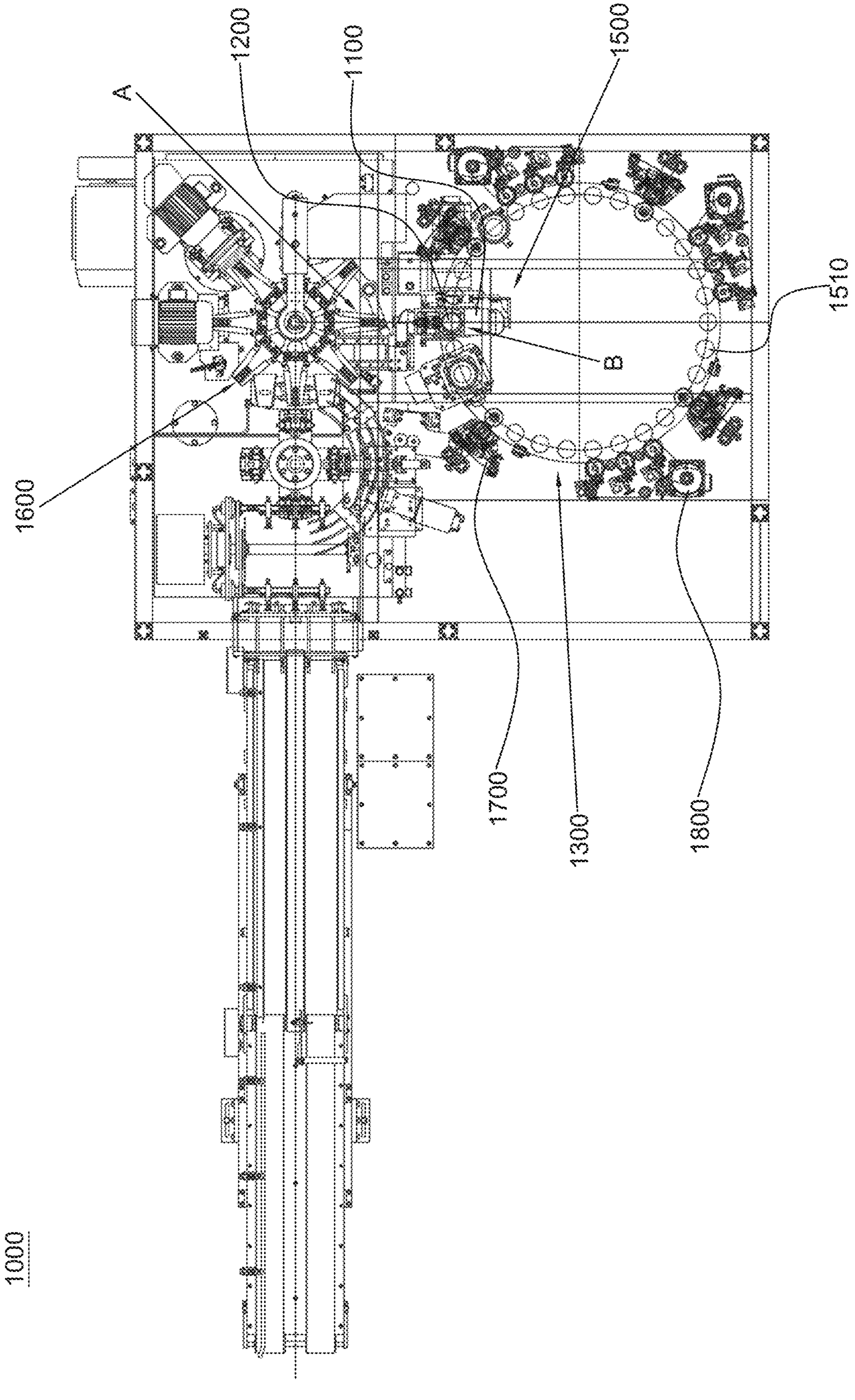
FIG. 1 is a drawing schematically illustrating an apparatus for manufacturing a double wall paper cup in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

First, by referring to FIG. 1 to FIG. 3, an apparatus for manufacturing a double wall paper cup in accordance with the present disclosure is explained below.

Figure 2:
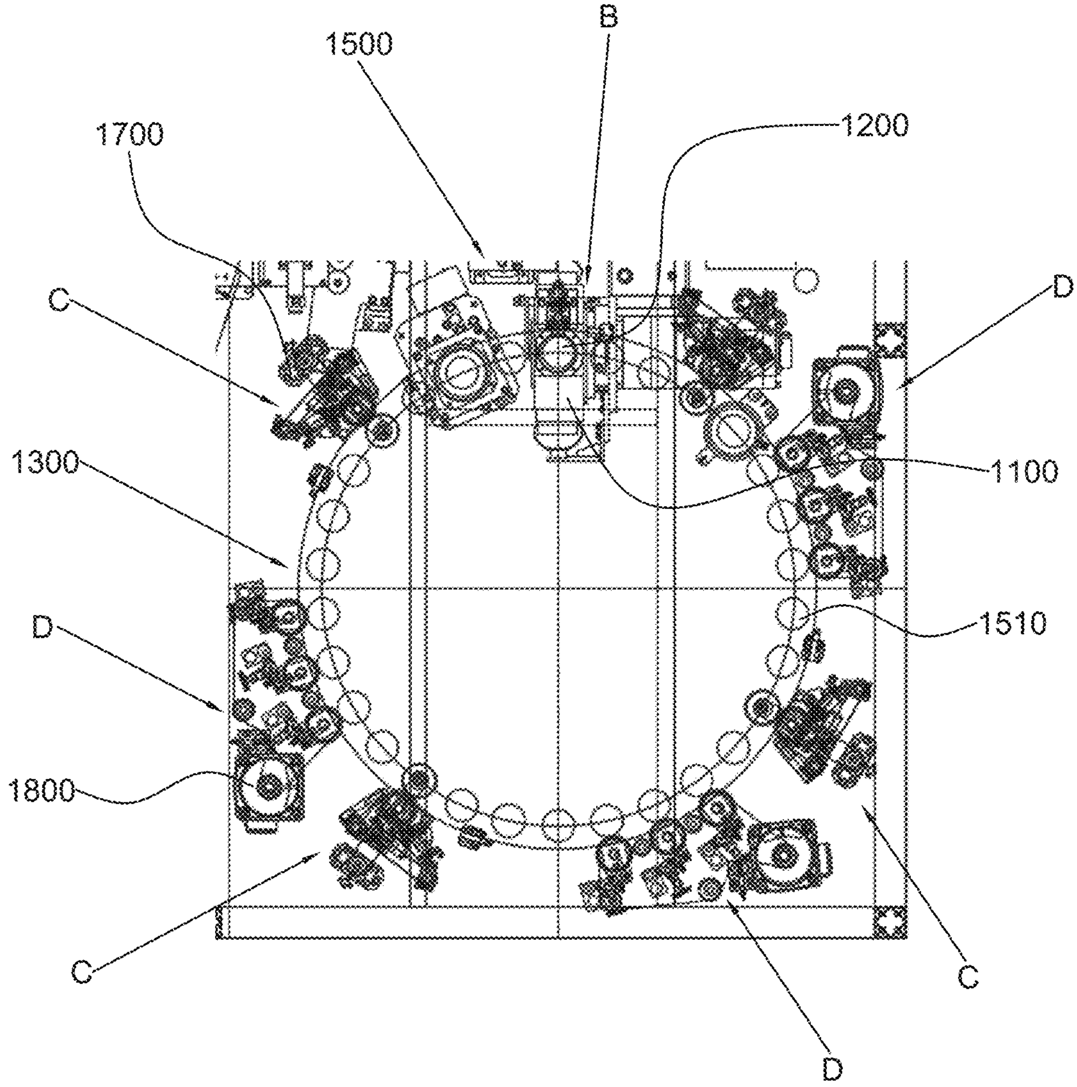
FIG. 2 is a drawing enlargingly illustrating a second rotation table of the apparatus for manufacturing the double wall paper cup in accordance with one example embodiment of the present disclosure.
Figure 3:
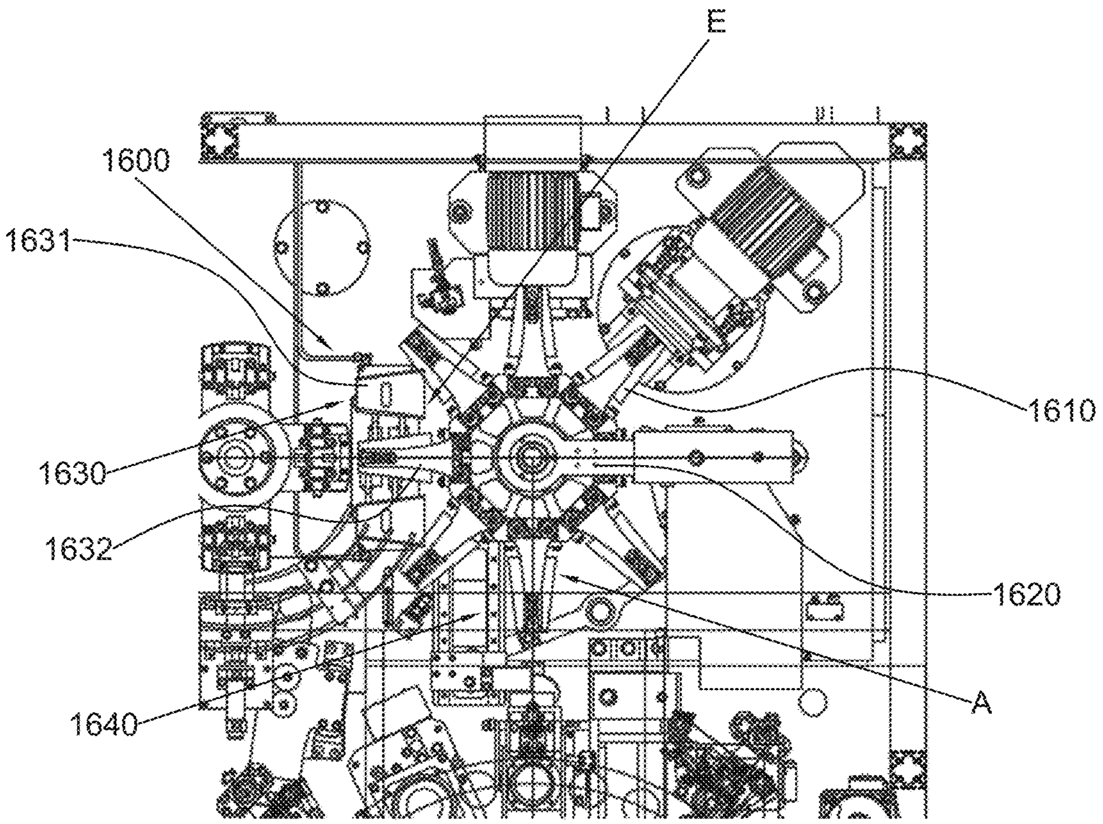
FIG. 3 is a drawing enlargingly illustrating an outer cup-forming part of the apparatus for manufacturing the double wall paper cup in accordance with one example embodiment of the present disclosure.

FIG. 1 is a drawing schematically illustrating the apparatus 1000 for manufacturing the double wall paper cup in accordance with one example embodiment of the present disclosure, FIG. 2 is a drawing enlargingly illustrating a second rotation table 1300 of the apparatus 1000 for manufacturing the double wall paper cup in accordance with one example embodiment of the present disclosure, and FIG. 3 is a drawing enlargingly illustrating an outer cup-forming part 1600 of the apparatus 1000 for manufacturing the double wall paper cup in accordance with one example embodiment of the present disclosure.

By referring to FIG. 1 to FIG. 3, the apparatus 1000 for manufacturing the double wall paper cup may include: a first rotation table 1100 configured to rotate intermittently on a horizontal rotating shaft; and a plurality of slots 1200 for an outer cup part, each of which is installed at intervals of a first predetermined angular value on an outer peripheral surface of the first rotation table 1100. Herein, the horizontal rotating shaft is arranged to be horizontal to a ground surface. In addition, the outer cup part may be inserted into a specific slot 1200*a* among the slots 1200 at an outer cup part-providing location A.

In this case, as one example, the outer cup part may have a smooth inner surface and a smooth outer surface with a tapered shape. As another example, the outer cup part may have a wrinkled inner surface with the tapered shape, which leads to an increase in an insulation effect. Further, the outer cup part may be a cup sleeve, but it is not limited thereto.

Further, the apparatus 1000 for manufacturing the double wall paper cup may include: a second rotation table 1300 configured to rotate intermittently on a vertical rotating shaft; and a stroker 1400 which is installed under the second rotation table 1300. Herein, the vertical rotating shaft is arranged to be vertical to the ground surface, and a part of the stroker 1400 is configured to move up and down at a combining location B, i.e., a location where an inner cup part and an outer cup part are combined.

In addition, the apparatus 1000 for manufacturing the double wall paper cup may include: a cup-combining unit 1500 has: (i) a plurality of inner cup part mandrels 1510, each of which is installed at intervals of a second predetermined angular value on a circumference area of an upper surface of the second rotation table 1300; and (ii) a plurality of pushers 1520, each of which has each of pushing shafts 1522. Herein, each of the pushing shafts 1522 may move up and down at the combining location B in directions perpendicular to the ground surface by using the stroker 1400. In response to moving a specific pushing shaft 1522*a* among the pushing shafts 1522 to an upper side of the second rotation table 1300 by using the stroker 1400 at the combining location B, the inner cup part held on a specific inner cup part mandrel 1510*a* among the inner cup part mandrels 1510 is pushed up to the specific slot 1200*a* where the outer cup part has been inserted, thereby allowing the outer cup part to be combined with the inner cup part. The detailed explanation on the stroker 1400 and the cup-combining unit 1500 will be explained later.

In addition, the apparatus 1000 for manufacturing the double wall paper cup may include: an outer cup-forming part 1600 has: (i) a turret 1620 configured to rotate intermittently on an outer cup part-rotating shaft arranged to be vertical to the ground surface; (ii) an outer cup part-folding part 1630 configured to generate the outer cup part with the tapered shape by using a specific outer cup part mandrel among outer cup part mandrels 1610 at a folding location E to thereby fold an original paper for the outer cup part; and (iii) an outer cup part-providing part 1640 configured to transfer the outer cup part from the specific outer cup part mandrel to the specific slot 1200*a* at an outer cup part-providing location A such that the outer cup part is held in the specific slot 1200*a* with a lower end of the outer cup part being fixed at the sharp groove 1230 to be explained later by referring to FIG. 6. Herein, a plurality of outer cup part mandrels 1610 are installed on the turret 1620 at intervals of a third predetermined angular value around the outer cup part-rotating shaft.

In this case, the specific outer cup part mandrel may have the tapered shape such that an outer surface of the specific outer cup part mandrel is in contact with an inner surface of the outer cup part.

Further, the outer cup part-folding part 1630 may have: wing parts 1631 configured to encircle the specific outer cup part mandrel when the original paper is arrived at the folding location E located between the outer cup part-folding part 1630 and the specific outer cup part mandrel. For example, the wing parts 1631 may have a left wing part and a right wing part. In this case, the left wing part and the right wing part may encircle the specific outer cup part mandrel tightly. In addition, the outer cup part-folding part 1630 may also have a seam clamp 1632 configured to apply pressure to an overlapped part on the specific outer cup part mandrel where one end of the original paper and the other end of the original paper are overlapped with each other, thereby allowing one end of the original paper and the other end of the original paper to be attached to form the outer cup part with the tapered shape.

In addition, the apparatus 1000 for manufacturing the double wall paper cup may further include at least one hot melt nozzle 1700 configured to coat a hot melt adhesive onto an outer side surface of the inner cup part at a hot-melting location C near a circumference part of the second rotation table 1300 while the inner cup part is being rotated due to a rotation of the specific inner cup part mandrel 1510*a* among the inner cup part mandrels 1510. Herein, the hot melt nozzle 1700 is arranged to be apart from the inner cup part by a certain distance. As illustrated in FIG. 2, a plurality of hot melt nozzles 1700 may be arranged at their corresponding hot-melting locations C near the circumference part of the second rotation table 1300. Each of the hot melt nozzles 1700 prepared for each of the hot-melting locations C may apply the same hot melt adhesive to the outer side surface of the inner cup part such that an adhesive layer on the outer side surface of the inner cup part becomes thicker. In this case, since a distance between the outer side surface of the inner cup part and the inner surface of the outer cup part is increased due to the adhesive layer, the insulating performance of the double wall paper cup would be better.

Further, the apparatus 1000 for manufacturing the double wall paper cup may further include: at least one air nozzle 1800 configured to emit cooling-air to the outer side surface of the inner cup part onto which the hot melt adhesive is coated. Herein, the air nozzle 1800 is located at a main air-cooling location D near the circumference part of the second rotation table 1300. Further, the main air-cooling location D is located downstream of a preliminary-cooling location with respect to a rotation path of the circumference part of the second rotation table 1300. Herein, the preliminary-cooling location located near the circumference part of the second rotation table 1300 is configured to cool the hot melt adhesive at room temperature. Further, the preliminary-cooling location is located downstream of the hot-melting location C with respect to the rotation path of the circumference part of the second rotation table 1300. Similar to another configuration of including a plurality of air nozzles 1800 may be arranged at their corresponding main air-cooling locations D.

Herein, a configuration capable of performing (i) coating the hot melt adhesive onto the outer side surface of the inner cup part by using the hot melt nozzle 1700, (ii) cooling the hot melt adhesive at room temperature, and (iii) emitting the cooling-air to the outer side surface of the inner cup part onto which the hot melt adhesive is coated by using the air nozzle 1800 may be arranged multiple times. That is, a set of the hot-melting location C, the preliminary-cooling location, and the main air-cooling location D may be repeatedly arranged near the circumference part of the second rotation table 1300.

Next, a configuration of the cup-combining unit 1500 will be explained in detail by referring to FIG. 4.

Figure 4:
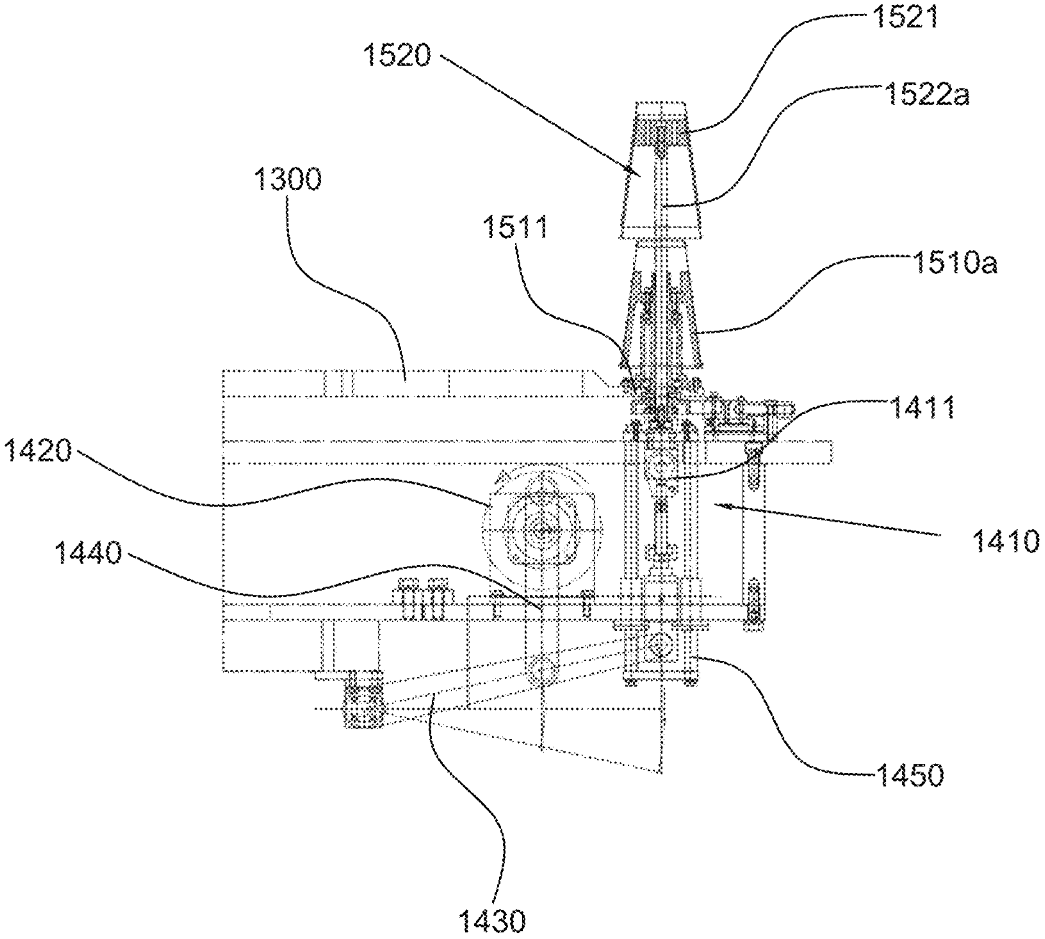
FIG. 4 is a drawing schematically illustrating a cup-combining unit of the apparatus for manufacturing the double wall paper cup in accordance with one example embodiment of the present disclosure.

FIG. 4 is a drawing schematically illustrating the cup-combining unit 1500 of the apparatus 1000 for manufacturing the double wall paper cup in accordance with one example embodiment of the present disclosure.

By referring to FIG. 4, the cup-combining unit 1500 may have a plurality of inner cup part mandrels 1510, each of which is installed at intervals of a second predetermined angular value on a circumference area of the upper surface of the second rotation table 1300.

In addition, the cup-combining unit 1500 further has a plurality of rotary driving parts 1511, each of which is located below each of the inner cup part mandrels 1510 and installed on a lower surface of the second rotation table 1300. Herein, each of the rotary driving parts 1511 is in contact with each of driving shafts corresponding to each of the inner cup part mandrels 1510. Herein, each of the driving shafts surrounds at least some parts of each of the pushing shafts 1522 such that each of the inner cup part mandrels 1510 is rotated on a central axis thereof. In this case, each of the rotary driving parts 1511 may receive each of driving forces from each of motors by using each of belt parts (not shown) whose one end is engaged with a specific motor (not shown) and whose opposite end is engaged with a specific rotary driving part 1511. The inner cup part mandrel 1510 can be rotated by a rotation of the rotary driving part 1511 such that the hot melt nozzle 1700 can coat the hot melt adhesive onto an entire outer side surface of the inner cup part at the hot-melting location C.

Further, the cup-combining unit 1500 further has a plurality of pushers 1520, each of which has each of pushing shafts 1522 engaged with each of heads 1521. Herein, each of the pushing shafts 1522 may move up and down in directions perpendicular to the ground surface via each of through-holes formed through each of the inner cup part mandrels 1510 and the second rotation table 1300. Herein, a specific pushing shaft **1522*a* among the pushing shafts 1522 is configured to be moved to a lower side of the second rotation table 1300 or to be moved to an upper side of the second rotation table 1300** via a specific through-hole among the through-holes.

In this case, each of the through-holes is configured to be formed such that a central axis of one through-hole is matched with a central axis of one inner cup part mandrel 1510.

Further, the apparatus 1000 for manufacturing the double wall paper cup further includes at least one stroker 1400, installed under the second rotation table 1300, each of which is configured to move up and down at the combining location B. Herein, the stroker 1400 may have a stroking rod 1410 which is connected to the lower end of the specific pushing shaft **1522*a* under the second rotation table 1300. Herein, the stroking rod 1410 is configured to be moved in directions parallel to the longitudinal axis of the specific pushing shaft 1522*a*, and a block part 1411 with a predetermined shape is mounted at the upper end of the stroking rod 1410. In this case, the stroking rod 1410 may have a long bar shape as shown in FIG. 4, but it is not limited thereto, and the block part 1411** may have a rectangular parallelepiped shape, but it is not limited thereto.

In addition, the stroker 1400 may have a rotary plate 1420 configured to rotate by receiving the driving force. Herein, the rotary plate 1420 has a cylindrical shape. Further, the stroker 1400 may further have a first link 1430 whose first one end is rotatably engaged with the lower part of the stroker 1400 and whose first opposite end is rotatably engaged with the lower end of the stroking rod 1410, and a second link 1440 whose second one end is rotatably engaged with a first predetermined point and whose second opposite end is rotatably engaged with a second predetermined point. Herein, the first predetermined point is located on a surface of the rotary plate 1420 and apart from a center point of the rotary plate 1420 by a first distance, and the second predetermined point is located on a surface of the first link 1430 and apart from the first opposite end by a second distance.

In this case, the second predetermined point may be a mid-point between the first one end and the first opposite end, but it is not limited thereto.

The stroker 1400 can be operated as follows. Firstly, the specific inner cup part mandrel **1510*a*, where the inner cup part having been coated and cooled is located, may be arrived at the combining location B. In this case, when the specific inner cup part mandrel 1510*a* is arrived at the combining location B, the pusher 1520, the specific inner cup part mandrel 1510*a*, and the specific slot 1200*a* can be arranged in a straight line. And the specific slot 1200*a* can also be arranged such that an upper end of the outer cup part with a larger diameter faces to the specific inner cup part mandrel 1510*a*. Under this condition, when the rotary plate 1420 receives the driving force, the second one end of the second link 1440 engaged with the rotary plate 1420 may be moved according to a rotation of the rotary plate 1420. In response to a movement of the second one end, the second opposite end of the second link 1440 may be moved. And in response to a movement of the second opposite end, the first opposite end of the first link 1430 moves up and down in directions perpendicular to the ground surface within a stroking distance. Further, in response to a vertical movement of the first opposite end, the stroking rod 1410 connected to a lower end of the specific pushing shaft 1522***a* is also moved up and down in directions perpendicular to the ground surface. In response to a vertical movement of the pusher 1520 and the stroker 1400, the inner cup part held on the specific inner cup part mandrel 1510*a* is pushed up to the specific slot 1200*a* where the outer cup part has been inserted, thereby allowing the outer cup part to be combined with the inner cup part.

Herein, the stroker 1400 further has a guide part 1450 configured to be installed bellow the second rotation table 1300 along a longitudinal direction of the specific pushing shaft 1522*a*. Herein, the guide part 1450 is installed to be apart from the stroking rod 1410 toward both sides of the stroking rod 1410 by a predetermined distance, and the guide part 1450 is in contact with side surfaces of the block part 1411, thereby allowing the stroking rod 1410 to move in the directions parallel to the longitudinal axis of the specific pushing shaft 1522*a*. In this case, the guide part 1450 may be a rail type which limits a direction of movement of the stroking rod 1410 to the directions parallel to the longitudinal axis of the pushing shaft 1522, but it is not limited thereto. For example, the guide part 1450 may be configured to limit the direction of the movement of the stroking rod 1410 by moving both the stroking rod 1410 and the block part 1411 at the same time.

However, the stroker 1400 does not necessarily require components such as the rotary plate 1420, the first link 1430, the second link 1440, and the stroking rod 1410. For example, the stroker 1400 may be comprised of a linearly driven cylinder, sub-motor, etc., but it is not limited thereto.

Next, an operation of the first rotation table 1100 and the plurality of slots 1200 will be explained schematically by referring to FIG. 5.

Figure 5:
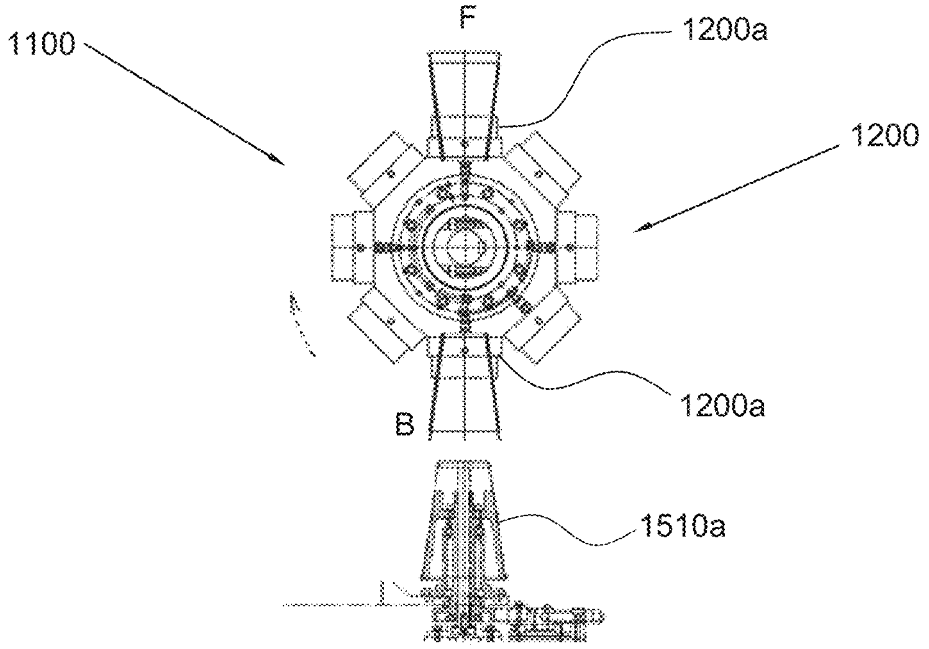
FIG. 5 is a drawing schematically illustrating a first rotation table and a plurality of slots of the apparatus for manufacturing the double wall paper cup in accordance with one example embodiment of the present disclosure.

FIG. 5 is a drawing schematically illustrating the first rotation table 1100 and the plurality of slots 1200 of the apparatus 1000 for manufacturing the double wall paper cup in accordance with one example embodiment of the present disclosure.

By referring to FIG. 5, the slots 1200 may be installed symmetrically with each other around the horizontal rotating shaft. Although eight slots 1200 are illustrated in FIG. 5, the number of slots 1200 is not limited thereto, and may be reduced or increased as the case may be.

By referring to FIG. 5, it is possible to rotate the first rotation table 1100 in a clockwise direction as shown by an arrow in a dotted line. Herein, the outer cup part may be inserted into the specific slot 1200*a* when the specific slot 1200*a* is located at a direction of three o'clock (not shown) by using an outer cup part-providing part 1640. Next, the inner cup part located on the specific inner cup part mandrel 1510*a* may be inserted into the specific slot 1200*a* by a movement of the pusher 1520 and the stroker 1400 when the specific slot 1200*a* is arrived at a direction of six o'clock (i.e., at an outer cup part-providing location B), thereby allowing the double wall paper cup to be generated. And then, the double wall paper cup may be discharged from the specific slot 1200*a* when the specific slot 1200*a* is located at a direction of twelve o'clock (i.e., at a discharging location F). Next, all the processes as mentioned above, i.e., the processes of (i) inserting the outer cup part into the specific slot 1200*a* when the specific slot 1200*a* is located at the direction of three o'clock (not shown) by using the outer cup part-providing part 1640, (ii) inserting the outer cup part located on the specific inner cup part mandrel 1510*a* into the specific slot 1200*a* by the movement of the pusher 1520 and the stroker 1400 when the specific slot 1200*a* is arrived at the direction of six o'clock, and (iii) discharging the double wall paper cup from the specific slot 1200*a* when the specific slot 1200*a* is located at the direction of twelve o'clock, may be repeated according to a rotation of the first rotation table 1100.

Next, a configuration of the slots 1200 will be explained in detail by referring to FIG. 6 and FIG. 7.

Figure 6:
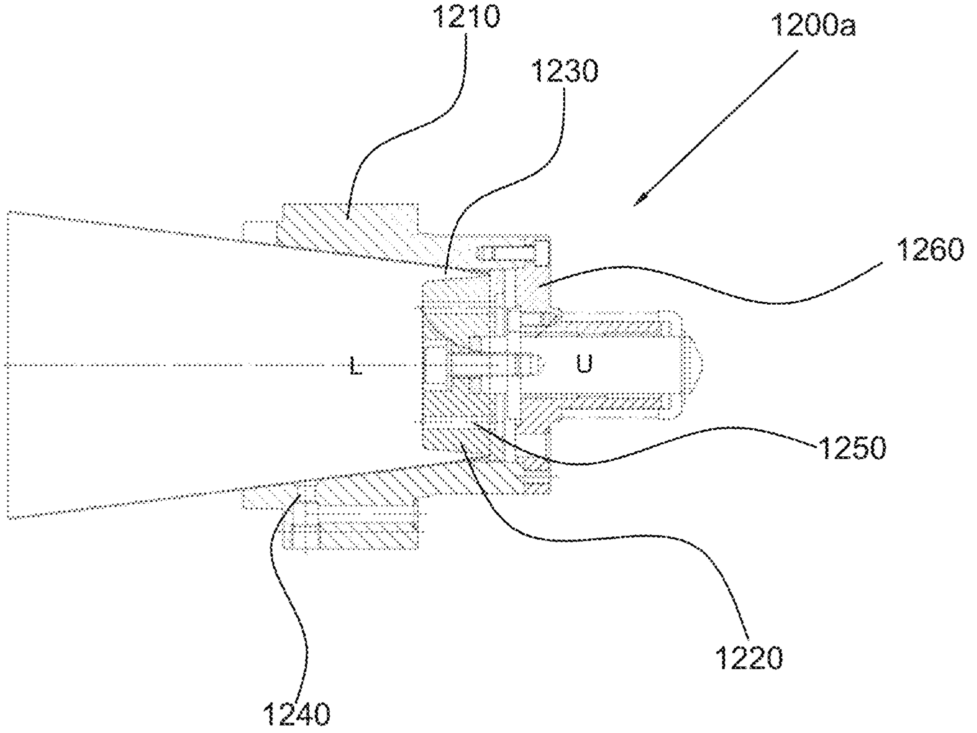
FIG. 6 is a drawing schematically illustrating a state of an inner cup part being inserted into a specific slot among the slots of the apparatus for manufacturing the double wall paper cup in accordance with one example embodiment of the present disclosure.

FIG. 6 is a drawing schematically illustrating a state of the inner cup part being inserted into the specific slot 1200*a* among the slots 1200 of the apparatus 1000 for manufacturing the double wall paper cup in accordance with one example embodiment of the present disclosure. And FIG. 7 is a drawing schematically illustrating a state of both the inner cup part and the outer cup part being inserted into the specific slot 1200*a* of the apparatus 1000 for manufacturing the double wall paper cup in accordance with one example embodiment of the present disclosure.

Figure 7:
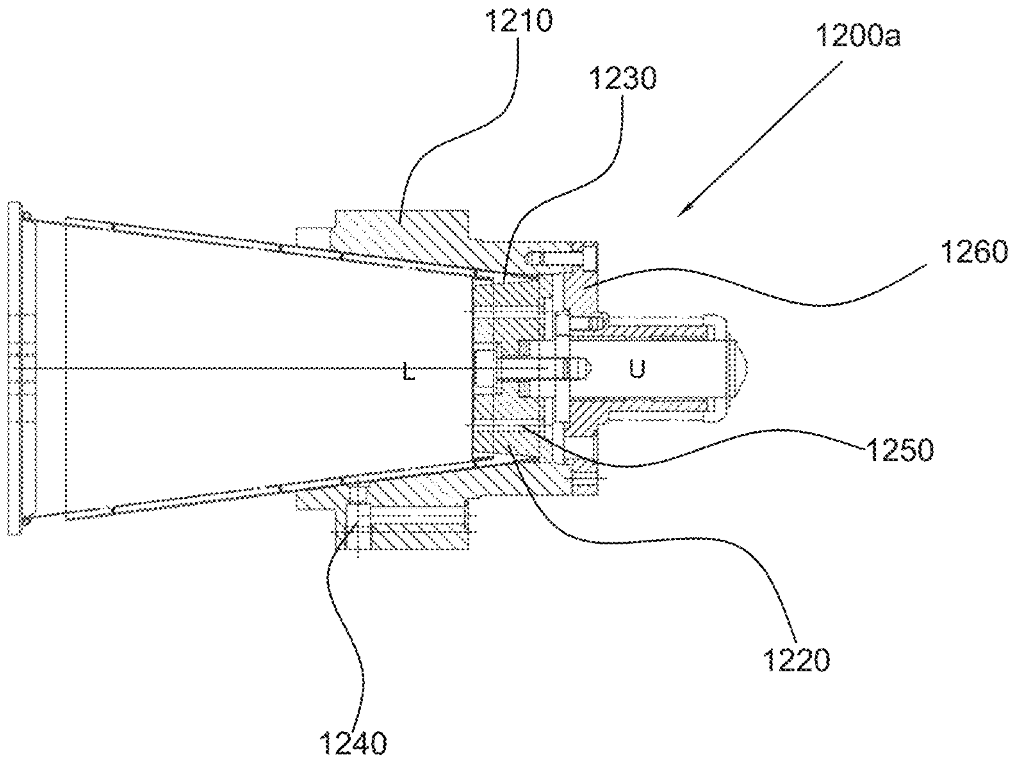
FIG. 7 is a drawing schematically illustrating a state of both the inner cup part and the outer cup part being inserted into the specific slot of the apparatus for manufacturing the double wall paper cup in accordance with one example embodiment of the present disclosure.

By referring to FIG. 6 and FIG. 7, the specific slot 1200*a* has a first body 1210 which surrounds at least some parts of an outer surface of the outer cup part while the outer cup part is inserted into the specific slot 1200*a*. Herein, the first body 1210 has an inner side surface with a first taper angle such that the inner side surface of the first body 1210 is in contact with the outer surface of the outer cup part. Further, the specific slot 1200*a* has a second body 1220 which has a side surface with a second taper angle and a lower surface that may be in contact with a bottom surface of the inner cup part after the inner cup part is inserted into the specific slot 1200*a*. Further, a space between an upper end of the inner side surface with a smaller diameter of the first body 1210 and the side surface of the second body 1220 forms the sharp groove 1230. A third body 1260 may be located at an upper side U of the first body 1210 and an upper side U of the second body 1220. In this case, the third body 1260 may be engaged with the first body 1210 by using, e.g., at least one first screw, and the third body 1260 may also be engaged with the second body 1220 by using, e.g., at least one second screw. In some cases, at least some of the first body 1210, the second body 1220, and the third body 1260 may be formed integrally.

That is, the sharp groove 1230 may be formed between the inner side surface of the first body 1210 and the side surface of the second body 1220 due to a difference between the first taper angle and the second taper angle. The second taper angle does not necessarily have to be the same as a taper angle of the outer side surface of the inner cup part. Further, a lower end of the outer cup part is capable of being inserted into the sharp groove 1230 such that the sharp groove 1230 can hold the lower end of the outer cup part after the outer cup part is inserted into the specific slot 1200*a*.

Further, the specific slot 1200*a* further has an air jet part configured to emit blast-air from the upper side U of the second body 1220 to a lower side L of the second body 1220 via at least one first through-hole with a first diameter such that the double wall paper cup is discharged from the specific slot 1200*a* by the blast-air at the discharging location F.

That is, when the double wall paper cup is arrived at the discharging location F (i.e., arrived at the direction of twelve o'clock in FIG. 5), the air jet part can emit the blast-air onto the bottom surface of the inner cup part such that the double wall paper cup can be discharged from the specific slot 1200*a*. Herein, the discharged double wall paper cup may be stacked up by going through a separate passage.

In addition, the specific slot 1200*a* has at least first vacuum hole 1240 configured to draw in absorbing-air from the inner side surface of the first body 1210 to an outer side surface of the first body 1210 via at least one second through-hole with a second diameter by using a first vacuum pump such that the outer surface of the outer cup part sticks to the inner side surface of the first body 1210.

Similarly, the specific slot 1200*a* has at least one second vacuum hole 1250 configured to draw in absorbing-air from the lower side L of the second body 1220 to the upper side U of the second body 1220 via at least one third through-hole with a third diameter by using a second vacuum pump such that the bottom surface of the inner cup part sticks to a lower surface of the second body 1220.

The present disclosure has an effect of accurately combining the inner cup part with the outer cup part by using the pusher of the cup-combining unit and the stroker such that the inner cup part held on the specific inner cup part mandrel is pushed up to the specific slot where the outer cup part has been inserted.

The present disclosure has another effect of fixing the lower end of the outer cup part at the sharp groove formed inside of the specific slot.

The present disclosure has still another effect of performing all of processes of holding the outer cup part on a rotation table, manufacturing the double wall paper cup by combining the inner cup part with the outer cup part, and discharging the double wall paper cup from the specific slot.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. An apparatus for manufacturing a double wall paper cup comprising:

a first rotation table configured to rotate intermittently on a horizontal rotating shaft, wherein the horizontal rotating shaft is arranged to be horizontal to a ground surface;

a plurality of slots for an outer cup part, each of which is installed at intervals of a first predetermined angular value on an outer peripheral surface of the first rotation table, wherein a specific slot among the slots is configured to hold a lower end of the outer cup part by using a sharp groove formed inside of the specific slot after the outer cup part is inserted into the specific slot at an outer cup part-providing location;

a second rotation table configured to rotate intermittently on a vertical rotating shaft, wherein the vertical rotating shaft is arranged to be vertical to the ground surface;

a stroker, which is installed under the second rotation table, wherein a part of the stroker is configured to move up and down at a combining location; and a cup-combining unit including: (i) a plurality of inner cup part mandrels, each of which is installed at intervals of a second predetermined angular value on a circumference area of an upper surface of the second rotation table; and (ii) a plurality of pushers, each of which has each of pushing shafts engaged with each of heads, wherein each of the pushing shafts is capable of moving up and down in directions perpendicular to the ground surface via each of through-holes formed through each of the inner cup part mandrels and the second rotation table, wherein a specific pushing shaft among the pushing shafts is configured to be moved to a lower side of the second rotation table or to be moved to an upper side of the second rotation table via a specific through-hole among the through-holes, and wherein a specific head among the heads is in contact with a lower end of an inner cup part; in case the specific pushing shaft is moved to the upper side of the second rotation table by using the stroker at the combining location, the inner cup part held on a specific inner cup part mandrel among the inner cup part mandrels is pushed up to the specific slot where the outer cup part has been inserted, thereby allowing the outer cup part to be combined with the inner cup part.

2. The apparatus for manufacturing the double wall paper claim 1, wherein the stroker includes:

(i) a stroking rod, which is connected to a lower end of the specific pushing shaft under the second rotation table, wherein the stroking rod is configured to be moved in directions parallel to a longitudinal axis of the specific pushing shaft, and wherein a block part with a predetermined shape is mounted at an upper end of the stroking rod;

(ii) a rotary plate configured to rotate by receiving a driving force, wherein the rotary plate has a cylindrical shape;

(iii) a first link whose first one end is rotatably engaged with a lower part of the stroker and whose first opposite end is rotatably engaged with a lower end of the stroking rod; and (iv) a second link whose second one end is rotatably engaged with a first predetermined point and whose second opposite end is rotatably engaged with a second predetermined point, wherein the first predetermined point is located on a surface of the rotary plate and apart from a center point of the rotary plate by a first distance, wherein the second predetermined point is located on a surface of the first link and apart from the first opposite end by a second distance.

3. The apparatus for manufacturing the double wall paper claim 2, wherein the stroker further includes: a guide part configured to be installed below the second rotation table along a longitudinal direction of the specific pushing shaft, wherein the guide part is installed to be apart from the stroking rod toward both sides of the stroking rod by a predetermined distance, and wherein the guide part is in contact with side surfaces of the block part, thereby allowing the stroking rod to move in the directions parallel to the longitudinal axis of the specific pushing shaft.

4. The apparatus for manufacturing the double wall paper claim 1, wherein the specific slot includes:

(i) a first body which surrounds at least some parts of an outer surface of the outer cup part while the outer cup part is inserted into the specific slot, wherein the first body has an inner side surface with a first taper angle such that the inner side surface of the first body is in contact with the outer surface of the outer cup part; and (ii) a second body which has a side surface with a second taper angle and a lower surface that is in contact with a bottom surface of the inner cup part after the inner cup part is inserted into the specific slot, wherein the second taper angle is different from the first taper angle;

wherein the sharp groove is formed between the inner side surface of the first body and the side surface of the second body such that the lower end of the outer cup part is inserted into the sharp groove.

5. The apparatus for manufacturing the double wall paper claim 4, wherein the specific slot further includes: an air jet part configured to emit blast-air from an upper side of the second body to a lower side of the second body via at least one first through-hole with a first diameter such that the double wall paper cup is discharged from the specific slot by the blast-air at a discharging location.

6. The apparatus for manufacturing the double wall paper claim 4, wherein the specific slot further includes:

(i) at least one first vacuum hole configured to draw in absorbing-air from the inner side surface of the first body to an outer side surface of the first body via at least one second through-hole with a second diameter by using a first vacuum pump such that the outer surface of the outer cup part sticks to the inner side surface of the first body; and (ii) at least one second vacuum hole configured to draw in absorbing-air from the lower side of the second body to the upper side of the second body via at least one third through-hole with a third diameter by using a second vacuum pump such that the bottom surface of the inner cup part sticks to the lower surface of the second body.

7. The apparatus for manufacturing the double wall paper claim 1, further comprising: an outer cup-forming part including: (i) a turret configured to rotate intermittently on an outer cup part-rotating shaft arranged to be vertical to the ground surface, wherein a plurality of outer cup part mandrels are installed on the turret at intervals of a third predetermined angular value around the outer cup part-rotating shaft; (ii) an outer cup part-folding part configured to generate the outer cup part with a tapered shape by using a specific outer cup part mandrel among the outer cup part mandrels at a folding location to thereby fold an original paper for the outer cup part; and (iii) an outer cup part-providing part configured to transfer the outer cup part from the specific outer cup part mandrel to the specific slot at an outer cup part-providing location such that the outer cup part is held in the specific slot with the lower end of the outer cup part being fixed at the sharp groove.

8. The apparatus for manufacturing the double wall paper claim 1, wherein the cup-combining unit further includes: a plurality of rotary driving parts, each of which is located below each of the inner cup part mandrels and installed on a lower surface of the second rotation table, wherein each of the rotary driving parts is in contact with each of driving shafts corresponding to each of the inner cup part mandrels, wherein each of the driving shafts surrounds at least some parts of each of the pushing shafts such that each of the inner cup part mandrels is rotated on a central axis thereof.

9. The apparatus for manufacturing the double wall paper claim 8, further comprising: at least one hot melt nozzle configured to coat a hot melt adhesive onto an outer side surface of the inner cup part at a hot-melting location near a circumference part of the second rotation table while the inner cup part is being rotated due to a rotation of the specific inner cup part mandrel, wherein the hot melt nozzle is arranged to be apart from the inner cup part by a certain distance.

10. The apparatus for manufacturing the double wall paper claim 9, further comprising: at least one air nozzle configured to emit cooling-air to the outer side surface of the inner cup part onto which the hot melt adhesive is coated, wherein the air nozzle is located at a main air-cooling location near the circumference part of the second rotation table, wherein the main air-cooling location is located downstream of a preliminary-cooling location with respect to a rotation path of the circumference part of the second rotation table, wherein the preliminary-cooling location located near the circumference part of the second rotation table is configured to cool the hot melt adhesive at room temperature, and wherein the preliminary-cooling location is located downstream of the hot-melting location with respect to the rotation path of the circumference part of the second rotation table.

* * * * *